United States Patent Office 3,131,232
Patented Apr. 28, 1964

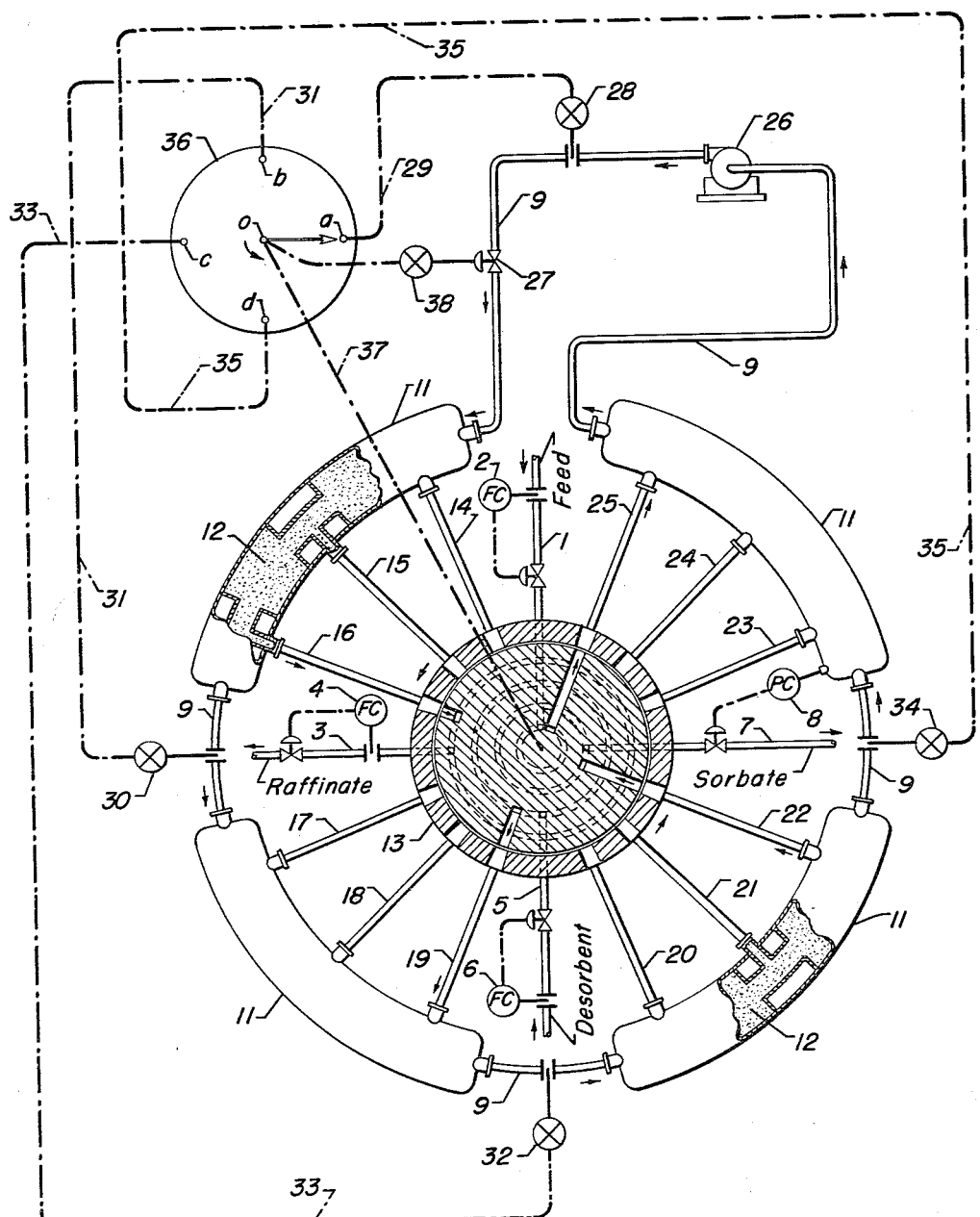

3,131,232
FLUID-SOLID CONTACTING PROCESS AND FLOW CONTROL METHOD THEREFOR
Donald B. Broughton, Chicago, Don B. Carson, Mount Prospect, and Laurence O. Stine, Western Springs, Ill., assignors to Universal Oil Products Company, Des Plaines, Ill., a corporation of Delaware
Filed July 27, 1959, Ser. No. 829,582
8 Claims. (Cl. 260—676)

This invention relates to a fluid-solid contacting process and particularly it concerns a method of manipulating and controlling a plurality of fluid streams being introduced to, and withdrawn from, a fixed bed contacting zone such that a multiplicity of equilibrium conditions are simultaneously maintained at spaced intervals within the zone. More specifically the present invention relates to a continuous selective sorption process utilizing a fixed bed of sorbent, although in the light of the following disclosure it will be apparent that the essential process configuration can be employed not only with respect to separation processes but to any fluid-solid contacting process wherein it is necessary to contact each of various portions of solid material successively with a number of different fluid materials on a cyclic basis.

Mixtures of compounds which are difficultly separable by distillation, crystallization, or extraction techniques may often be readily resolved by contacting the mixture with a solid or solids which selectively combine in some form with at least one component of the mixture; the mechanism by which a component is selectively retained may be adsorption, absorption, clathration, occlusion or chemical reaction and all of these mechanisms are generically designated herein as "sorption" processes. A particularly desirable sorption process, one widely recognized in the art, involves the separation of isomeric hydrocarbons by means of a solid particulate sorbent comprising a dehydrated metal aluminosilicate of the zeolite family, commonly known as "molecular sieves." The separation may be readily effected by passing a mixture of iso and normal hydrocarbons over the sorbent whereby the normal hydrocarbon is sorbed by the sieves and an effluent or raffinate stream comprising substantially pure iso hydrocarbons is recovered. When it is desired to make a continuous process of this selective quality, it is necessary, in order to reuse the sieves and to recover the normal product or sorbate, to desorb the normal hydrocarbon from the sieves. This can be accomplished by subjecting the normal hydrocarbon-saturated sieves to the influence of a preponderantly greater quantity of desorbent which is preferably a material capable of displacing the normal hydrocarbon from the sieves and which is readily separable from the normal hydrocarbon by fractional distillation.

A continuous process for separating iso from normal paraffins may be effected by employing a moving bed of sorbent which passes downwardly as a column from a sorption zone wherein the sorbent countercurrently contacts a rising stream of mixed iso and normal hydrocarbons, thereby sorbing the normal, to a desorption zone immediately below the feed point wherein the bed is contacted with a desorbent. A suitable column may have an intermediate feed point for the iso-normal mixture and a lower feed point for the desorbent operated in conjunction with an upper takeoff point for removing a mixture of iso hydrocarbons and desorbent and a takeoff point immediately below the feed point for removing a mixture of normal hydrocarbons and desorbent. The sorbent discharged from the bottom of the column must be lifted to the top and begin its descent to produce the effect of a continuously moving column passing downwardly through all zones. Although this system is very desirable because it yields a continuous product and it may be operated as a continuous process, it is very difficult to carry out in practice because many sorbents, especially molecular sieves, are physically fragile and are soon destroyed by the strains involved in a moving bed process.

It has been found that an essentially continuous sorption process may be effected by maintaining the sorbent in the form of a fixed elongated bed or series of discrete beds and moving the feed and product inlet and outlet points instead of attempting to move the bed itself. In this method the various inlet and outlet streams are charged and withdrawn respectively, in a continuous manner, without interruption, with respect to either the flow rate or composition of the several streams, the bed of solid sorbent remaining in substantially fixed position within the sorption column, the feed and desorbent inlets and the product withdrawal outlets changing their position into and out of the column in equal increments. Although the solid sorbent remains in fixed position, a simulated countercurrent flow arrangement is thereby established, since incoming feed is contacted at its point of introduction with sorbent relatively spent in comparison with downstream contacting zones; that is, the raffinate stream or least sorbed component of the feed stock is withdrawn from a bed in a series of sorbent beds constituting the sorption zone at the opposite end of the series from the feed stock inlet. This process may also be visualized as being carried out in a series of four interconnected zones of a single fixed bed of solid sorbent having no actual line of demarcation between each of the zones other than the zone boundaries defined by the points of inlet and withdrawal for the various fluid streams. The first and farthest upstream zone is referred to as a "sorption" zone, the next downstream zone is referred to as a "primary rectification" zone, the next adjacent downstream zone is referred to as a "desorption" zone and the farthest downstream zone is designated as a "secondary rectification" zone. The terms "upstream" and "downstream" are to be interpreted herein in their ordinary and usual definition in the chemical process arts; that is, the term "downstream" refers to an advanced point in the direction of flow relative to the point of reference, whereas "upstream" refers to a retrospective point in the direction of fluid flow. A fluid pump is provided between at least one pair of adjacent beds to provide a positive, unidirectional flow of fluid which is the basic circulation flow maintained through the serially connected sieve beds in the absence of feed introduction and product withdrawal. An essential characteristic of the process is that a continuously flowing stream of fluid is circulated through the series of beds from the first to the last in series; this circulating stream is designated herein as the "pumparound" stream. It is also necessary that the contacting zone be elongated in the direction of fluid flow therethrough so that a partitioning effect, with respect to the components being separated, may be realized, and spurious concentrations gradients in directions other than in the direction of flow may be avoided. In the specific 4-zone method hereinabove described, it is essential, too, that at least two inlet streams be added to the pumparound stream and at least two outlet fluid streams be withdrawn from the pumparound stream, the outlet points alternating with the points of inlet.

The successful operation of the process hinges upon the precise control of a number of critical variables such as the flow rates of the various inlet and outlet streams, the system pressure and temperature, the rate at which the feed and product inlet and outlet points are moved in relation to the length of the fixed bed or beds, and especially the pumparound flow rate, which must be controlled to within at least 1–2% of the operating point for a reasonably good separation between the iso and normal components of the feed. It has been found that a deviation of only 10% in the pumparound flow rate, if sustained sufficiently long for steady-state conditions to obtain, will cause the degree of separation to approach zero. When the flow rates of the inlet and outlet streams are established at predetermined levels by suitable automatic means, the pumparound rate may still be independently varied without upsetting the plant material balances; as noted, however, the product composition is critically dependent upon the magnitude of the pumparound flow rate. In the steady-state operation of this process, it is obvious, from a material balance standpoint, that the sum of the mass flow rates of the inlet streams must equal the sum of the mass flow rates of the outlet streams, but in general there will be disparities in the volumetric flow rates of the individual streams. These flow rates are added to or subtracted from the basic circulation flow rate (pumparound flow) through the beds so that the actual volumetric flow rate will be different in each of the four contacting zones; furthermore, since the points of entry and exit of the various streams move incrementally or approximately continuously with time, the zones of minimum, intermediate and maximum flow rates are correspondingly shifted. Essentially, then, the mechanism of the process may be visualized as a series of four discrete zones, each having a different flow rate therethrough and each having a different component concentration profile along the length of the zone, which zones exist simultaneously, at any instant of time, within a single elongated fixed bed at spaced intervals along the length thereof; these zones move through the bed at a speed determined by the rate at which the inlet and outlet streams are advanced, but the physical spacing therebetween remains constant. Since one end of the elongated bed communicates with the other to form a closed flow path therethrough, the four zones are repeatedly advanced through the bed and thus, to an observer stationed at a fixed point external to the system, they appear to "rotate" at constant speed relative to said bed. With respect to flow-controlling the pumparound rate, a single fixed point of flow measurement will prove totally inoperable, as will be more clearly apparent from the illustrative examples to follow. Specifically, the present invention contemplates the provision of a plurality of flow-measuring points disposed within the contacting zone at spaced intervals therealong, the number and spacing of the flow-measuring points being peculiarly prescribed by the system geometry, that is, by the total number of inlet and outlet streams and by the total number of inlet and outlet points associated with the contacting bed; further, the relative spacing between the inlet and outlet streams is also determined by, and restricted in accordance with, the system geometry.

It is an object of this invention to provide an improved technique for contacting fluids with a fixed bed of solid material such that a simulated countercurrent contacting process may be obtained.

It is a particular object of this invention to provide, in a continuous-cyclic contacting process, a novel method by which a series of contiguous equilibrium zones may be simultaneously maintained in, and continuously moved through, an elongated fixed bed of solid material, the product stream or streams being withdrawn from those portions of the bed having the highest concentration of the desired components.

Still another object of the present invention is to provide, in a multiple stream fluid-solid contacting process of the class described, a symmetrical arrangement of the various feed and product streams together with a plurality of symmetrically spaced flow-measuring points within the contacting bed whereby the various critical flow rates may be continuously and accurately controlled.

A further object of the present invention is to provide a fixed bed selective sorption process utilizing molecular sieves for effecting the continuous separation of a mixture of iso and normal hydrocarbons.

These and other objects of the instant invention will be apparent from the accompany disclosure and drawing.

In one embodiment, this invention consists in a continuous flow system which comprises circulating a fluid through an elongated contacting zone one end of which communicates with the other through a flow-regulating means to form a closed flow path therethrough, said zone having $m$ intermittent flow-conducting transfer points spaced along the length of the flow path, substantially simultaneously introducing to and withdrawing from said zone $n$ secondary fluid streams through a set of corresponding inlet and outlet points selected from said $m$ transfer points and spaced along said flow path such that any two adjacent transfer points presently conducting two of said secondary streams are separated by $$\left(\frac{m}{n}-1\right)$$

transfer points not presently conducting any of said secondary streams where the ratio $m/n$ is a positive integer and $n \geq 2$, substantially simultaneously and unidirectionally shifting said secondary streams successively from one set of transfer points to the next while maintaining the relative spacing therebetween constant whereby each of the secondary streams eventually passes through each of said transfer points, providing $n$ fixed flow-measuring points along said flow path and spacing said flow-measuring points such that $m/n$ transfer points are provided between any two adjacent flow-measuring points, measuring the flow rates existing at said $n$ flow-measuring points, adjusting said flow-regulating means responsive successively to each of said resulting measured flow rates and advancing from one measured flow rate to the next in the same direction as the secondary streams are shifted when said secondary streams traverse said flow-measuring points.

In a more limited embodiment, this invention concerns a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, which process comprises continuously circulating a fluid through a series of 4 serially connected elongated contacting zones, the last zone of said series communicating with the first through a flow regulating means to form a closed flow path therethrough, each of said zones containing a fixed bed of said solid sorbent and each having $m/4$ intermittent flow-conducting transfer points spaced along its length, introducing a feed stream containing said mixture of fluid compounds into a first zone, substantially simultaneously withdrawing a first product stream containing relatively less sorbed component from a second zone which is immediately downstream relative to said first zone, introducing a desorbent stream capable of displacing the selectively sorbed component from said sorbent into a third zone which is immediately downstream relative to said second zone, substantially simultaneously withdrawing a second product stream containing a mixture of selectively sorbed component and desorbent from the fourth zone which is immediately downstream with respect to said third zone and upstream with respect to said first zone, introducing said feed and desorbent streams to and withdrawing said first and second product streams from the zones through a set of corresponding inlet and outlet points selected from said transfer points and spaced along said flow path such that any two adjacent transfer points presently conducting two of said streams are separated by $$\left(\frac{m}{4}-1\right)$$

transfer points not presently conducting any of said streams, substantially simultaneously shifting said secondary streams successively from one set of transfer points to the next in a downstream direction while maintaining the relative spacing therebetween constant whereby each of said stream eventually passes through each of $m$ transfer points, providing four fixed flow-measuring points along said flow path each between adjacent contacting zones, measuring the flow rates existing at said four flow-measuring points, adjusting said flow-regulating means responsive successively to each of said resulting measured flow rates and advancing from one measured flow rate to the next in the same direction as the secondary streams are shifted when said secondary streams traverse said flow-measuring points.

To enable a clearer presentation of the subject matter, this invention will be described first with reference to a specific continuous-cyclic selective sorption process and then with regard to more general aspects. Representative of the systems to which this invention finds immediate application is the separation of isomeric hydrocarbons utilizing molecular sieves as the sorbent. By way of example, the feed stock may comprise a mixture of iso and normal hexanes, the desorbent n-butane, and the molecular sieves a dehydrated calcium aluminosilicate hydrate having a pore diameter of about 5 Angstrom units; molecular sieves of this type are able to selectively sorb a straight chain compound containing at least 4 carbon atoms and to reject cyclic or branched-chain compounds also containing at least 4 carbon atoms. When feed stock comprising a mixture of iso and normal hexanes is passed through a sieve bed, the major portion of the normal hexane is initially retained therein and the resultant effluent is relatively rich in isohexanes. After the sieves have become saturated with normal hexanes, no further sorption is possible and the composition of the effluent ultimately becomes the same as that of the feed. Normal butane is then passed through the bed, which displaces the previously sorbed n-hexane from the sieves, and the effluent now principally comprises a mixture of n-butane and n-hexane. By alternately introducing feed and desorbent to the sieve bed and withdrawing therefrom portions of the effluent at the appropriate times, an efficient separation between the normal and iso hexanes may be obtained; although the two product streams are contaminated with n-butane, this may be easily removed by subsequent fractionation of the product streams, whereby normal and iso hexane product purities in excess of 99% may be readily achieved.

The above-described sorption process may be implemented in a continuous manner using the flow scheme illustrated in the accompanying drawing. The specific embodiment of this invention shown in the drawing is, of course, illustrative and is not intended to be limiting upon the broad scope thereof. This particular separation is best effected entirely in the liquid phase and at substantially isothermal conditions, although the flow arrangement of the instant invention is equally well adapted to gas or vapor phase operations. Referring now to the drawing, four contacting chambers 11, each containing a molecular sieve bed 12, are connected in series via conduits 9 with pump 26 and motor control valve 27 to form a closed flow path therethrough. Pump 26 maintains a continuously circulating carrier stream, or pumparound stream, through the elongated flow path, which stream is throttled by control valve 27 in response to the action of flow controller 38 in a manner to be hereinafter described. Although contacting chambers 11 are herein shown diagrammatically as circumferentially spaced vessels, in actual practice they may comprise a series of vertically elongated contacting columns, the uppermost end of one column being connected by conduit means to the uppermost or lowermost end of the next succeeding column. It should be emphasized, however, that for the purposes of the present invention, it is not necessary that separate vessels be provided; instead, contacting chambers 11 may be combined to form a unitary elongated column mounted vertically or horizontally. The sole reason for the provision of physically distinct vessels is to permit conventional conduit installation of flow measuring means 30, 32 and 34 at the appropriate intervals within the closed flow path; if desired, an equivalent arrangement could be constructed by disposing orifice plates, venturi sections or other flow-measuring devices at spaced intervals within a single elongated column. Insofar as the form of the sieve bed is concerned, the essential requirement here is simply the provision of an elongated contacting zone, one end of which communicates with the other to form a closed flow path therethrough.

A suitable multiport rotary distributing valve 13 simultaneously conducts four secondary streams, that is, two feed and two product streams, to and from the sieve bed respectively, rotating in the same direction (downstream) as the circulating liquid or carrier stream flows through the beds. Valve 13 may be of the rotary plug type, or rotary disc type as illustrated herein. Feed stock, containing a mixture of iso and normal hexanes, flows through conduit 1 to valve 13, the flow rate thereof being controlled by flow controller 2; the feed is directed to a sealed annular groove in the valve disc and is conducted through a radial channel therein to the appropriate port in the periphery of the valve body.

Three other secondary streams, hereinbelow described, are distributed by valve 13 in identical fashion to separate portions of the contacting zone. A raffinate stream, containing iso hexanes and normal butane, is withdrawn from the system through conduit 3 and its flow rate is controlled by flow controller 4. Desorbent, comprising n-butane, is charged to the process through conduit 5 and is flow-controlled by controller 6. A sorbate stream, containing normal hexane and normal butane, is withdrawn from the system through conduit 7, the flow thereof being throttled by pressure controller 8 which acts in response to the liquid pressure existing at a selected point within the closed flow path.

Preferably the point of pressure control is chosen at the region of lowest system pressure, which, because of the pressure drop through the elongated bed and control valve 27, is at or near the suction of pumparound pump 26. The pressure is controlled at a high enough level to prevent flashing or sporadic vaporization of the liquid within the contacting zone at the existing process temperature. For the liquid hexane-butane system herein described, the contacting temperature may range from about 50° F. to about 300° F. and the system pressure may vary from about 50 p.s.i.g. to about 500 p.s.i.g., depending upon the vapor pressure of the lowest boiling component present, in this case n-butane. For example, with a liquid temperature of 200° F., it is preferable to maintain a minimum system pressure of about 220 p.s.i.g. The feed and desorbent streams are preheated to the desired temperature by suitable heat exchanger means or fired heaters (not shown) and chambers 11 are preferably well-insulated in order to achieve substantially isothermal conditions within the contacting zone.

A plurality of transfer conduits, numbered consecutively 14 through 25, are arranged such that each connects a restricted portion of bed 12 with a peripheral port of rotary valve 13. Each of transfer conduits 14 through 25 inclusive conducts in turn (1) liquid to the bed, which will be feed stock or desorbent depending on the position of the rotary valve, (2) no flow at all for several (in this example, two) successive adjusted positions of the rotary valve when the conduit is blocked by the solid portions of the disc of valve 13, and (3) liquid from the bed, which will be either raffinate or sorbate. Normally the rotary valve is held in an adjusted position of from about ½ to about 10 minutes, after which it is quickly advanced to its next adjusted position, thereby simultaneously shifting the points of entry and withdrawal of the feed and product streams in equal increments in a downstream direction relative to the carrier flow through the sieve bed. After the rotary valve has completed one revolution, each of conduits 14 to 25 inclusive will have conducted, in turn, feed, sorbate, desorbent and raffinate.

An essential requirement of the invention is that the four secondary streams be symmetrically spaced with respect to the length of the flow path formed by chambers 11, that is, there must be an equal number of transfer conduits not presently conducting any of said secondary streams between each of the transfer conduits which are conducting secondary streams. For example, when valve 13 is in the position shown in the drawing, feed enters the bed through conduit 25, raffinate leaves the bed through conduit 16, desorbent enters the bed through conduit 19, and sorbate leaves the bed through conduit 22. Between adjacent flow-conducting transfer conduits 25 and 16 there are two non-flow-conducting conduits 14 and 15; similarly, between adjacent flow-conducting conduits 16 and 19, or conduits 19 and 22, or conduits 22 and 25, there are in each instance two non-flow-conducting transfer conduits. As valve 13 rotates, the equal phase relationship between the secondary streams is, of course, preserved. This requirement of stream symmetry is generally, but not necessarily, equivalent to saying that the physical lengths of the portions of the sieve bed between each of the transfer conduits are equal. However, in some cases it may be desirable to provide a longer bed length between one or more pairs of adjacent transfer conduits; for example, the bed length between conduits 14 and 15 may be 4 ft. while the bed length between conduits 15 and 16 may be only 2 ft., or chambers 11 may be of unequal length, etc. But insofar as the operability of this invention is concerned, such unsymmetrical bed lengths may be readily accommodated, provided that the symmetry of the secondary stream spacing is maintained.

When rotary valve 13 is in the position shown in the drawing, the feed stream, consisting principally of a mixture of normal and isohexanes, enters the contacting zone through conduit 25, joins the carrier liquid therein and flows downstream through pump 26, control valve 27, and a sieve bed 12 downstream therefrom which constitutes the "sorption" zone. In the sorption zone the feed stock contacts the molecular sieve sorbent which selectively sorbs the n-hexane component of the feed stock into its porous structure and selectively excludes the isohexane components thereof, the straight chain component being retained in the solid sorbent while the branched-chain components are permitted to pass through the bed of sorbent. At the downstream end of the sorption zone only a mixture of isohexane and normal butane remains, and a portion of this mixture is withdrawn as raffinate through conduit 16 and valve 13 and may be sent to subsequent fractionation facilities. The next portion of the bed downstream from conduit 16 constitutes the "primary rectification" zone wherein remaining carrier liquid undergoes a secondary separation whereby the isohexanes are concentrated in the first portion of the bed immediately succeeding the raffinate withdrawal point. Thus only essentially pure normal butane is present in the carrier liquid leaving the primary rectification zone and to this stream is added fresh normal butane via conduit 19. The next portion of the sieve bed downstream from conduit 19 forms the "desorption" zone wherein a preponderance of normal butane displaces from the pores of the molecular sieve sorbent the normal hexane component previously sorbed from the feed stock in a prior cycle of operation. At the end of the desorption zone a portion of the circulating liquid, which now comprises mainly normal hexane and normal butane, is withdrawn as sorbate through conduit 22 and valve 13 and may then be sent to subsequent fractionation facilities. The next downstream contacting zone between conduits 22 and 25 serves as the "secondary rectification" zone whereïn isohexanes previously retained by the sieves are washed out of the beds by the circulating carrier stream. At the end of the secondary rectification zone, the carrier liquid, now comprising mainly normal hexane, isohexanes and normal butane is joined with feed stock entering the zone through conduit 25, thus completing the circuit around the closed flow path. Each of the above operations, which occur simultaneously, has been described with reference to rotary valve position of the drawing, that is, when feed stock enters the sieve bed through conduit 25. As valve 13 is rotated, the four zones hereinabove described also advance correspondingly; for example, that physical portion of the sieve bed which presently serves as the sorption zone becomes, successively, the secondary rectification zone, the desorption zone, and finally the primary rectification zone, whereupon the cycle is repeated.

The mechanism of the sorption process having been thus briefly described, the flow control system of this invention will now be presented in detail. The various control elements contemplated for use in this invention, namely, flow transmitters, controllers, switches, control valves, etc. will be selected from conventional, commercially available instrumentation utilizing pneumatic, electronic or hydraulic signals which may be analog or digital in nature. Four flow transmitters 28, 30, 32 and 34 are installed in each of conduits 9 and are adapted to measure the instantaneous flow rates existing between contacting chambers 11. The transmitters may be conventional force-balance or motion-balance differential pressure instruments or head flowmeters utilizing an orifice, flow tube, venturi tube or pitot tube installed in the conduit; equally satisfactory are area flowmeters or rotameters, propeller meters, or hot wire anemometers, these latter types of flow transmitters being installed directly in the conduit. Flow transmitters 28, 30, 32 and 34 transmit their flow signals to a rotary selecting means 36 via lines 29, 31, 33 and 35 respectively. The rotary selecting means may be a rotary selector switch or stepping switch in the case of electronic flow signals, or a rotary distributing valve in the case of fluid pressure signals. Selecting means 36 is mechanically or electrically linked to the shaft of valve 13 by suitable connecting means 37, such that signal lines 29, 31, 33 and 35 are each successively connected, at the proper time, to flow controller 38 during one revolution of valve 13. Flow controller 38 thus receives, at any one time, a single, selected flow signal and actuates valve 27 in response thereto.

The spacing of the flow-measuring points and the time at which the flow signals are switched are also essential features of the present invention. The flow-measuring points must be spaced around the length of the flow path such that an equal number of transfer conduits lie between each of said flow-measuring points; in the present example, any two adjacent flow-measuring points are separated by three transfer conduits. The symmetrical arrangement both of the transfer conduits and of the flow-measuring points results in simultaneous traversal of the flow-measuring points by the secondary streams as valve 13 is rotated. The term "traversal" is defined herein as the shift in the point of introduction or withdrawal of a secondary stream from a transfer conduit immediately upstream or downstream of a flow-measuring point to a transfer conduit immediately downstream or upstream of said flow-measuring point. For example, the feed stream traverses flow transmitter 28 when it is shifted from conduit 25 to conduit 14, and simultaneously therewith the raffinate, desorbent, and sorbate streams traverse flow transmitters 30, 32 and 34 respectively. Selecting means 36 is synchronized with the position of valve 13 such that the point of flow measurement is advanced in the same direction as valve 13 is rotated when such traversal occurs, in this example, four times per revolution of valve 13. Using the feed stream as a reference point, the relationship between the feed position, selector position, and controlled flow is set forth in Table I below:

TABLE I

| Feed Entering Conduit | Selector Switch Position | Point of Measurement of Controlled Flow |
|---|---|---|
| 23, 24, 25 | o–a | Transmitter 28. |
| 14, 15, 16 | o–b | Transmitter 30. |
| 17, 18, 19 | o–c | Transmitter 32. |
| 20, 21, 22 | o–d | Transmitter 34. |

With the system aligned in accordance with Table I, the flow rate in the sorption zone serves as the variable upon which the pumparound rate is controlled by throttling valve 27, and as the sorption zone progresses through the sieve bed, so does the point of flow measurement. Since the flow rates of the secondary streams are individually controlled, fixing the flow rate in the sorption zone, by material balance, automatically fixes the flow rates in the primary rectification, desorption, and secondary rectification zones. Of course, the flow rate of any of the latter three zones may also serve as the controlled variable by appropriately resetting selecting means 36 while holding the angular position of valve 13 constant. It is preferred, however, to use the flow rate of either the sorption zone or the primary rectification zone as the controlled variable since the specific gravity of the circulating liquid within these zones changes the least with time, thereby reducing a potential source of error in the flow measurement and/or eliminating the need for specific gravity compensation of the flow signals.

The following two examples are given to further demonstrate the utility and operation of the flow control method of this invention. In the first example, a single point of flow measurement will be used; in the second example, multiple points of flow measurement will be used in accordance with this invention, and the behavior of the system in each case will be compared. In both examples, volumetric quantities will be assumed to be additive for purposes of simplification; the actual error in such assumption will in no way effect the validity of the comparison.

*Example I*

With reference to the drawing, valve 13 is in the position illustrated. Feed stock is introduced through conduit 25 at 100 units of flow, which units may be g.p.m., g.p.h., b.p.d., etc. Raffinate is withdrawn through conduit 16 at 90 units of flow, desorbent is charged through conduit 19 at 120 units of flow and sorbate is withdrawn through conduit 22 at 130 units of flow. Selector switch 36 is locked in position o–a, and connecting means 37 is disconnected so that the pumparound flow is at all times controlled by the closed loop comprising transmitter 28, controller 38 and valve 27. Controller 38 is adjusted to hold the flow at 400 units. The primary rectification zone flow, as measured by transmitter 30, is 310 units; the desorption zone flow, as measured by transmitter 32, is 430 units; and the secondary rectification zone flow, as measured by transmitter 34, is 300 units. If now, valve 13 is rotated counterclockwise through one complete revolution, the flow rates in all four zones will change after each traversal of the flow measuring points, as shown in Table II:

TABLE II

| Feed Entering Conduits | Flow Rate, Units | | | |
|---|---|---|---|---|
| | Sorption Zone | Primary Rectification Zone | Desorption Zone | Secondary Rectification Zone |
| 23–25 | ¹ 400 | 310 | 430 | 300 |
| 14–16 | 500 | 410 | 530 | ¹ 400 |
| 17–19 | 370 | 280 | ¹ 400 | 270 |
| 20–22 | 490 | ¹ 400 | 520 | 390 |

¹ Indicates controlled flow, as measured by transmitter 28.

It is apparent that the flow rates in each of the four zones vary, during one cycle, an amount equal to the greatest secondary stream flow rate, in this case the sorbate stream (130 units). In view of the fact that the flow rates of the zones must be held to within 1–2% of the operating point for the sorption process to be operable, it is obvious that a single, fixed point of flow measurement such as, for example, transmitter 28, would be completely ineffective and would render the process inoperable.

*Example II*

Initial conditions are the same as in Example I, i.e., the feed enters conduit 25 at 100 units of flow, etc. Now, however, connecting means 37 is made operative so that selector switch 36 successively occupies positions o–b, o–c, o–d and o–a as the feed stream traverses transmitters 28, 30, 32 and 34 respectively. As valve 13 is turned counterclockwise through one revolution, the flow rates in all four zones remain constant, as shown in Table III:

TABLE III

| Feed Entering Conduits | Flow Rate, Units | | | |
|---|---|---|---|---|
| | Sorption Zone | Primary Rectification Zone | Desorption Zone | Secondary Rectification Zone |
| 23–25 | ¹ 400 | 310 | 430 | 300 |
| 14–16 | ¹ 400 | 310 | 430 | 300 |
| 17–19 | ¹ 400 | 310 | 430 | 300 |
| 20–22 | ¹ 400 | 310 | 430 | 330 |

¹ Indicates controlled flow, as measured by transmitters 28, 30, 32, and 34 in succession.

In effect, the point of flow measurement is caused to rotate in step with the rotating zones, and the flow in one zone being controlled, the flows in the other three zones are automaticaly fixed.

The embodiment and examples heretofore described have been restricted in form to a specific number of transfer conduits, secondary streams and flow-measuring points, namely, 12 transfer conduits, 4 secondary streams and 4 flow-measuring points. However, the general principles revealed thereby may be applied to a virtually unlimited number of geometrically similar systems wherein the number of transfer conduits, secondary streams and flow-measuring points may be jointly or severally varied, subject to certain critical limitations imposed by the requirement of geometrical symmetry. In general, the closed flow path may be provided with $m$ number of transfer points, that is, points at which each of the secondary streams will be introduced to or withdrawn from the contacting zone through the transfer conduits in communication therewith. In addition, there may be $n$ number of secondary streams where $n$ is equal to or greater than 2; that is to say, if there is one inlet stream there must be at least one outlet stream in order to maintain a constant inventory of fluid within the contacting zone proper. However, it is possible to have one inlet stream and two or more outlet streams, or one outlet stream and two or more inlet streams, or any number of inlet and outlet streams, the sum total of both being equal to $n$. The number of distinct equilibrium zones which are maintained at spaced intervals within the contacting zone is also equal to $n$. The flow rates and concentration profiles of the equilibrium zones may all be different but will be held constant as the zones progress through the bed. The inlets and outlets may or may not be spaced in alternating relationship around the closed flow path, but the flow rates of the streams must be of such magnitude that the net flow existing within all portions of the elongated contacting zone is unidirectional. Furthermore, the ratio $m/n$ must be an integer; for example, a system wherein $m=25$ transfer points and $n=6$ secondary streams would not be operable within the scope of this invention, whereas a system in which $m=24$ and $n=6$ is operable. An additional restriction is that the secondary streams must be equally spaced with respect to the total number of transfer points; between any two adjacent transfer points presently conducting two of the secondary streams, there must be provided $$\left(\frac{m}{n}-1\right)$$

transfer points not conducting any of said secondary streams. For example, in the sorption process illustrated in the drawing, $$\left(\frac{m}{n}-1\right)=\left(\frac{12}{4}-1\right)=2$$

non-flow-conducting transfer conduits between any adjacent pair of flow-conducting transfer conduits; for a system wherein $m=24$ and $n=4$, adjacent flow-conducting transfer points would be separated by 5 non-flow-conducting transfer points, etc. Another essential element of the instant invention is that the number of flow-measuring points must be equal to the number of secondary streams, and these, too, must be symmetrically spaced along the flow path with respect to the total number of transfer points; in other words, there must be $n$ number of flow-measuring points spaced such that any two adjacent flow measuring points are separated by $m/n$ transfer points. In the drawing, for example, $m/n=12/4=3$ transfer conduits between any two adjacent flow-measuring points. By virtue of these restrictions, the resultant system may be viewed as a series of $n$ discrete equilibrium zones existing simultaneously within, and being caused to rotate through, a closed flow path, each of the $n$ zones having at all times one, and only one, flow-measuring point associated therewith. If the symmetry requirement is not met, as for example, if there should be a random distribution of the secondary streams and/or the flow-measuring points, then at one position of the rotational cycle a given zone may overlap two or more flow-measuring points, while at another position of the rotational cycle the same zone may escape flow measurement altogether, a manifestly undesirable characteristic which must be avoided if the process is to be operable.

The symmetrical spacing of the secondary streams does not, however, preclude the use of other non-symmetrically spaced tertiary streams having a very small flow rate in comparison with the secondary streams and the pumparound stream. Although not shown in the drawing, it is frequently advantageous to employ a small flushing stream of desorbent to sweep out the transfer conduit which just previously conducted the feed stream, in order to prevent contamination of the sorbate stream with feed; the flow rate of the flushing stream is just sufficient to displace the volume of the transfer conduit during the time that distributing valve 13 remains in an adjusted position, the displaced material being injected into the secondary rectification zone. The flow rate of the flush stream is usually about 1–5% of that of the secondary streams. Since it is relatively small, it has no appreciable effect on the main flow within the secondary rectification zone and does not, of itself, create a region of different equilibrium conditions therein. It is, therefore, within the scope of the present invention to include such minor symmetrical streams which will not interfere with the overall sorption-desorption equilibria.

The process of this invention is applicable to many types of fluid separations utilizing inclusion complexes, whether carried out in the liquid, gas or vapor phase. With reference to selective sorption by means of molecular sieves, the process can be used to isolate not only branched-chain aliphatic hydrocarbons but also cyclic hydrocarbons containing 4 or more carbon atoms, such as benzene, toluene, xylene, etc., polycyclic aromatics, cycloparaffins, etc. The process may also be employed in the purification of water by ion-exchange resins. In addition to zeolites, other inclusion complexes may constitute the fixed bed contacting zone, such as hydroquinone for the purification of argon, nickel cyanide-ammonia for the separation of benzene, urea and thiourea adducts for the sorption of straight chain aliphatic hydrocarbons, desoxycholic acid for the sorption of aromatics and fatty acids, etc. The flow pattern of this invention may also be adapted to various reaction processes involving a fixed bed of catalyst which must be periodically regenerated, or utilizing a solid reactant such as metallic iron and iron oxide in the steam-iron reaction for the production of hydrogen. In general, this invention makes it possible to realize the same benefits of continuous flow and particle regeneration with a fixed bed of contact material as with a fluidized or gravitating bed, while avoiding those problems of abrasion of equipment and particle attrition commonly associated with moving bed techniques.

We claim as our invention:

1. In a continuous fluid-solid contacting process for altering the composition of a feed stream to yield at least one product stream wherein a fluid is continuously circulated through an elongated contacting zone containing a solid contacting material which effects said alteration of composition, one end of which zone communicates with the other through a flow-regulating means to form a closed flow path therethrough, said zone having $m$ intermittent flow-conducting transfer points spaced along the length of the flow path, and wherein there are substantially simultaneously introduced to and withdrawn from said zone $n$ secondary fluid streams including said feed and product streams through a set of corresponding inlet and outlet points selected from said $m$ transfer points and spaced along said flow path such that any two adjacent transfer points presently conducting two of said secondary streams are separated by $$\left(\frac{m}{n}-1\right)$$

transfer points not presently conducting any of said secondary streams where the ratio $m/n$ is a positive integer and $n \geq 2$, and wherein said secondary streams are substantially simultaneously and unidirectionally shifted in a downstream direction successively from one set of transfer points to the next while maintaining the relative spacing therebetween constant whereby each of the secondary streams eventually passes through each of said transfer points, the method of controlling the flow rate of said circulating fluid existing within a given portion of said closed flow path which lies between a selected pair of adjacent secondary streams, which method comprises: sensing the flow rates existing at $n$ fixed flow-measuring points which are disposed in and along said flow path such that $m/n$ transfer points are located between any two adjacent flow-measuring points, producing a first flow signal responsive to the sensed flow rate existing at that flow-measuring point which presently lies between said selected pair of streams, automatically adjusting said flow-regulating means responsive to said first flow signal whereby to maintain the corresponding flow rate substantially constant, additionally producing a series of flow signals each responsive to a corresponding one of the sensed flow rates existing at the other $n-1$ flow-measuring points, and successively advancing the source of flow signal in response to which said flow-regulating means is adjusted as aforesaid from one flow-measuring point to the next adjacent downstream flow-measuring point upon corresponding successive traversals of said flow-measuring points by said secondary streams, whereby the flow rate of the circulating fluid within said given portion of the flow path is maintained substantially constant irrespective of the instantaneous physical position of the secondary streams relative to said flow-regulating means.

2. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, including the steps of continuously circulating a fluid through a series of four serially connected elongated contacting zones, the last zone of said series communicating with the first through a flow-regulating means to form a closed flow path therethrough, each of said zones containing a fixed bed of said solid sorbent and each having $m/4$ intermittent flow-conducting transfer points spaced along its length, introducing a feed stream containing said mixture of fluid compounds into a first zone, substantially simultaneously withdrawing a first product stream containing relatively less sorbed component from a second zone which is immediately downstream relative to said first zone, introducing a desorbent stream capable of displacing the selectively sorbed component from said sorbent into a third zone which is immediately downstream relative to said second zone, substantially simultaneously withdrawing a second product stream containing a mixture of selectively sorbed component and desorbent from the fourth zone which is immediately downstream with respect to said third zone and upstream with respect to said first zone, introducing said feed and desorbent streams to and withdrawing said first and second product streams from the zones through a set of corresponding inlet and outlet points selected from said transfer points and spaced along said flow path such that any two adjacent transfer points presently conducting two of said streams are separated by $$\left(\frac{m}{4}-1\right)$$

transfer points not presently conducting any of said streams, substantially simultaneously shifting all of said streams successively from one set of transfer points to the next in a downstream direction while maintaining the relative spacing therebetween constant whereby each of said streams eventually passes through each of $m$ transfer points, the method of controlling the flow rate of said circulating fluid existing within a given portion of said closed flow path which lies between a selected adjacent pair of said streams, which method comprises: sensing the flow rates existing at four fixed flow-measuring points each disposed in said flow path between adjacent contacting zones, producing a first flow signal responsive to the sensed flow rate existing at that flow-measuring point which presently lies between said selected pair of streams, automatically adjusting said flow-regulating means responsive to said first flow signal whereby to maintain the corresponding flow rate substantially constant, additionally producing a series of flow signals each responsive to a corresponding one of the sensed flow rates existing at the other three flow-measuring points, and successively advancing the source of flow signal in response to which said flow-regulating means is adjusted as aforesaid from one flow-measuring point to the next adjacent downstream flow-measuring point upon corresponding successive traversals of said flow-measuring points by said streams, whereby the flow rate of the circulating fluid within said given portion of the flow path is maintained substantially constant irrespective of the instantaneous physical position of said streams relative to said flow-regulating means.

3. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, including the steps of continuously circulating a fluid through a series of $n$ serially connected elongated contacting zones, the last zone of said series communicating with the first through a flow-regulating means to form a closed flow path therethrough, each of said zones containing a fixed bed of said solid sorbent and each having $m/n$ intermittent flow-conducting transfer points spaced along its length, substantially simultaneously introducing to and withdrawing from said zones in alternating relationship $n$ secondary fluid streams including, in the following order and proceeding in a downstream direction with respect to said closed flow path:

(1) a feed stream containing said mixture of fluid compounds,
(2) a first product stream containing relatively less sorbed component,
(3) a desorbent stream capable of displacing the selectively sorbed component from said sorbent, and
(4) a second product stream containing a mixture of selectively sorbed component and desorbent, said feed and desorbent streams being introduced to and said first and second product streams being withdrawn from said zones through a set of corresponding inlet and outlet points selected from said transfer points and spaced along said flow path such that any two adjacent transfer points presently conducting two of said streams are separated by $$\left(\frac{m}{n}-1\right)$$

transfer points not presently conducting any of said secondary streams, substantially simultaneously shifting said secondary streams successively from one set of transfer points to the next in a downstream direction while maintaining the relative spacing therebetween constant whereby each of said streams eventually passes through each of $m$ transfer points, the method of controlling the flow rate of said circulating fluid existing within a given portion of said closed flow path which lies between a selected pair of adjacent secondary streams, which method comprises sensing the flow rates existing at $n$ fixed flow-measuring points each disposed in said flow path between adjacent contacting zones, producing a first flow signal responsive to the sensed flow rate existing at that flow-measuring point which presently lies between said selected pair of streams, automatically adjusting said flow-regulating means responsive to said first flow signal whereby to maintain the corresponding flow rate substantially constant, additionally producing a series of flow signals each responsive to a corresponding one of the sensed flow rates existing at the other $n-1$ flow-measuring points, and successively advancing the source of flow signal in response to which said flow-regulating means is adjusted as aforesaid from one flow-measuring point to the next adjacent downstream flow-measuring point upon corresponding successive traversals of said flow-measuring points by said secondary streams, whereby the flow rate of the circulating fluid within said given portion of the flow path is maintained substantially constant irrespective of the instantaneous physical position of the secondary streams relative to said flow-regulating means.

4. The process of claim 2 further characterized in that said sorbent is a dehydrated metal aluminosilicate hydrate containing pores which permit the sorption of a straight chain compound containing at least 4 carbon atoms and which rejects compounds containing at least 4 carbon atoms having a branched chain or cyclic structure.

5. The process of claim 4 further characterized in that said mixture of fluid compounds comprises a normal aliphatic hydrocarbon containing at least 4 carbon atoms as the selectively sorbed component and a hydrocarbon selected from a group consisting of branched chain and cyclic hydrocarbons containing at least 4 carbon atoms as the other component relatively less sorbed by the sorbent.

6. The system of claim 1 further characterized in that the flow rates of said secondary streams are controlled at predetermined levels.

7. The system of claim 6 further characterized in that $(n-1)$ secondary streams are independently flow-controlled and the flow rate of the resulting remaining stream is adjusted such that the fluid pressure existing at a selected pressure-measuring point within said closed flow path is maintained substantially constant.

8. The system of claim 1 further characterized in that said circulating fluid is maintained substantially in the liquid phase.

References Cited in the file of this patent

UNITED STATES PATENTS

| | | |
|---|---|---|
| 2,599,545 | Egan et al. | June 10, 1952 |
| 2,957,485 | Boyd | Oct. 25, 1960 |
| 2,985,589 | Broughton et al. | May 23, 1961 |